United States Patent
Safarik et al.

(10) Patent No.: US 7,631,885 B2
(45) Date of Patent: Dec. 15, 2009

(54) INTELLIGENT INTERLOCK FOR A MOTORCYCLE STAND

(75) Inventors: David Safarik, Muskego, WI (US); Ben Hodge, Milwaukee, WI (US); Frank Molinaro, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 318 days.

(21) Appl. No.: 11/735,821

(22) Filed: Apr. 16, 2007

(65) Prior Publication Data

US 2008/0252041 A1    Oct. 16, 2008

(51) Int. Cl.
    *B62H 7/00*    (2006.01)
(52) U.S. Cl. ....................................... 280/293
(58) Field of Classification Search ................ 280/293
    See application file for complete search history.

(56) References Cited

U.S. PATENT DOCUMENTS

| | | | | |
|---|---|---|---|---|
| 4,010,379 A | * | 3/1977 | Shimamoto | 307/9.1 |
| 4,016,538 A | * | 4/1977 | Miller | 340/457 |
| 4,084,656 A | * | 4/1978 | Itoh et al. | 180/219 |
| 4,488,455 A | * | 12/1984 | Shetler et al. | 477/90 |
| 4,883,284 A | * | 11/1989 | Nakazawa et al. | 280/293 |
| 4,976,452 A | * | 12/1990 | Fujita | 280/293 |
| 5,100,164 A | * | 3/1992 | Miyamaru et al. | 280/301 |
| 6,150,929 A | * | 11/2000 | Wang | 340/432 |
| 6,536,792 B2 | * | 3/2003 | Strasser | 280/293 |
| 6,733,025 B2 | * | 5/2004 | Su et al. | 280/293 |
| 6,918,607 B2 | * | 7/2005 | Nakazawa et al. | 280/301 |
| 6,964,426 B2 | * | 11/2005 | Kuboshima et al. | 280/301 |
| 7,377,533 B2 | * | 5/2008 | Takeuchi et al. | 280/272 |
| 2004/0212172 A1 | * | 10/2004 | Nakazawa et al. | 280/293 |

FOREIGN PATENT DOCUMENTS

| | | |
|---|---|---|
| EP | 0077431 | 4/1983 |
| EP | 0175414 | 3/1986 |
| EP | 0238354 | 9/1987 |
| EP | 0788967 | 8/1997 |
| EP | 1338497 | 8/2003 |
| EP | 1442970 | 8/2004 |
| EP | 1519157 | 3/2005 |
| EP | 1521946 | 4/2005 |
| EP | 1548408 | 6/2005 |
| EP | 1560013 | 8/2005 |
| EP | 1595114 | 11/2005 |
| EP | 1602898 | 12/2005 |

(Continued)

*Primary Examiner*—Lesley Morris
*Assistant Examiner*—Michael R Stabley
(74) *Attorney, Agent, or Firm*—Michael Best & Friedrich LLP

(57) ABSTRACT

A motorcycle including a frame, an engine mounted to the frame, and a stand movable between an extended position in which the stand supports the motorcycle and a retracted position. The motorcycle includes a sensor operable to generate a stand signal indicative of at least one of the extended and retracted positions of the side stand and a controller electrically coupled to the sensor to receive the stand signal. The controller is programmed for preventing operation of the engine based on the stand signal during a first operating condition of the motorcycle and is further programmed to allow running of the engine during a second operating condition of the motorcycle, regardless of the stand signal.

26 Claims, 5 Drawing Sheets

FOREIGN PATENT DOCUMENTS

| | | |
|---|---|---|
| EP | 1604219 | 12/2005 |
| EP | 1606589 | 12/2005 |
| WO | 2004008080 A1 | 1/2004 |
| WO | 2004076980 A1 | 9/2004 |
| WO | 2004079385 A1 | 9/2004 |

* cited by examiner

INTELLIGENT INTERLOCK FOR A MOTORCYCLE STAND

BACKGROUND

The present invention relates to motorcycle stands and electronic interlocks for use therewith. More specifically, the invention relates to an intelligent control system for selectively shutting off or preventing starting of the engine based on an operating condition of the motorcycle.

SUMMARY

In one embodiment, the invention provides a motorcycle including a frame, an engine mounted to the frame, and a stand movable between an extended position in which the stand extends outward and is operable to support the motorcycle and a retracted position in which the stand is retracted inward. The motorcycle further includes a sensor operable to generate a stand signal indicative of a position of the side stand and a controller electrically coupled to the sensor to receive the stand signal. The controller is programmed for preventing operation of the engine based on the stand signal during a first operating condition of the motorcycle and is further programmed to allow running of the engine during a second operating condition of the motorcycle, regardless of the stand signal.

In another embodiment, the invention provides an interlock circuit for a motorcycle having a frame, an engine mounted to the frame, a transmission coupled to the engine, and a stand movable between an extended position for supporting the motorcycle and a retracted position. The interlock circuit includes a sensor operable to generate a stand signal indicative of the position of the stand and a controller electrically coupled to the sensor to receive the signal. The controller is programmed for preventing operation of the engine based on the stand signal during a first operating condition of the motorcycle and is further programmed to allow running of the engine during a second operating condition of the motorcycle, regardless of the stand signal.

In yet another embodiment, the invention provides a method of operating a motorcycle having an engine, a transmission, and a stand, which supports the motorcycle in an extended position and is movable to a retracted position. The method includes sensing a position of the stand and sensing an operating condition of the motorcycle. The engine is prevented from operating based on a sensed position of the stand when the motorcycle is in a first operating condition. The engine is allowed to operate regardless of a position of the stand when the motorcycle is in a second operating condition.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
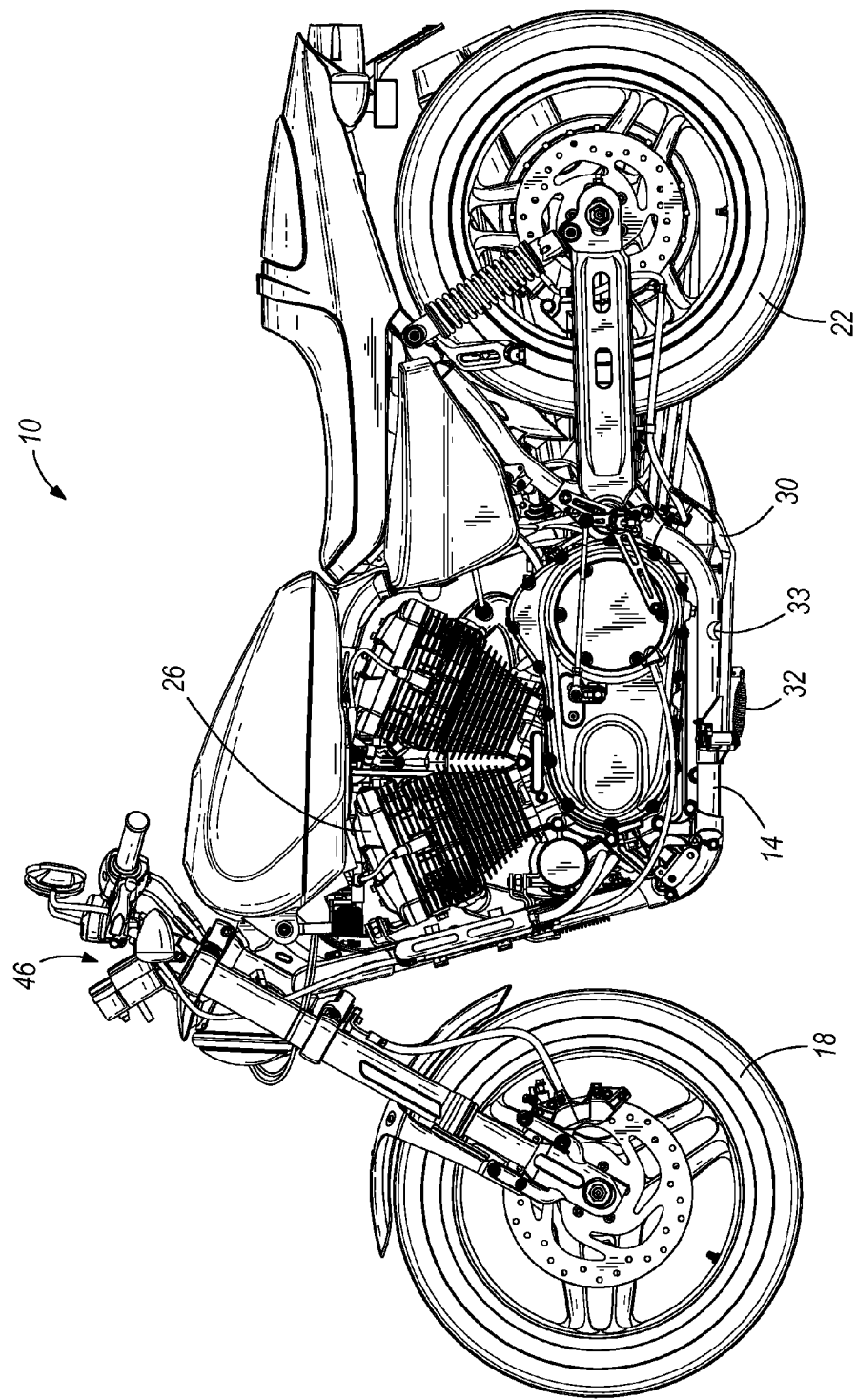
FIG. 1 is a side view of a motorcycle with a side stand and a stand interlock circuit according to one embodiment of the invention.

FIG. 1 illustrates a motorcycle 10 having a frame 14, a front wheel 18, a rear wheel 22, and an engine 26. The motorcycle 10 also includes a side stand 30 for supporting the motorcycle 10 in an upright position during periods of non-use. In other embodiments, a center stand (not shown) is included on the motorcycle 10 in addition to or instead of the side stand 30. The illustrated side stand 30 is attached to the frame 14 for pivoting movement between extended (i.e., "down") and retracted (i.e., "up") positions. A spring 32 is coupled to both the side stand 30 and the frame 14 in a position which allows the side stand 30 to be biased by the spring 32 in either of the extended or retracted positions. In the retracted position, the side stand 30 abuts a resilient stop 33 on the frame 14.

Figure 2:
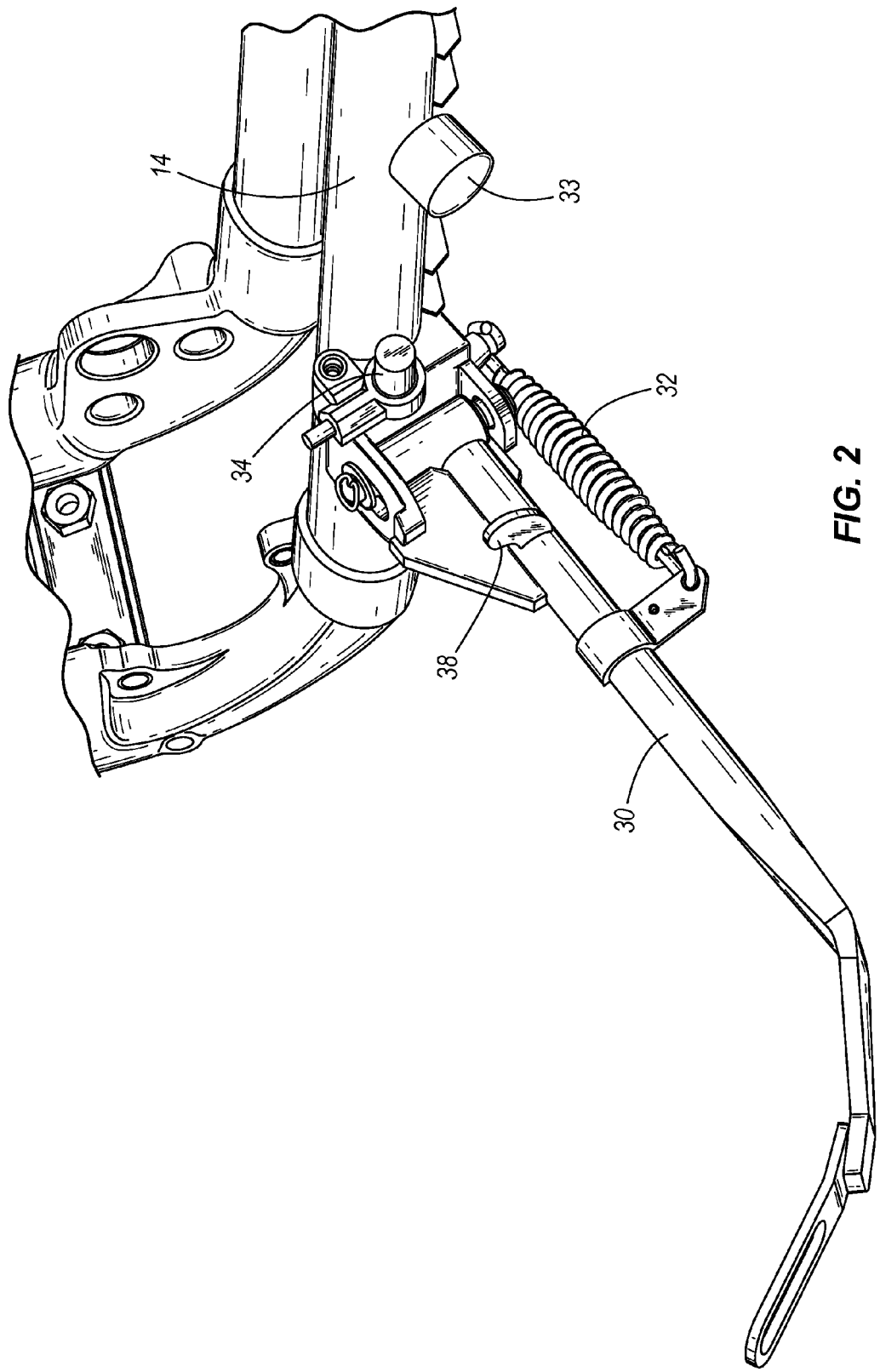
FIG. 2 is an enlarged perspective view of the side stand of the motorcycle of FIG. 1 in the extended position.
Figure 3:
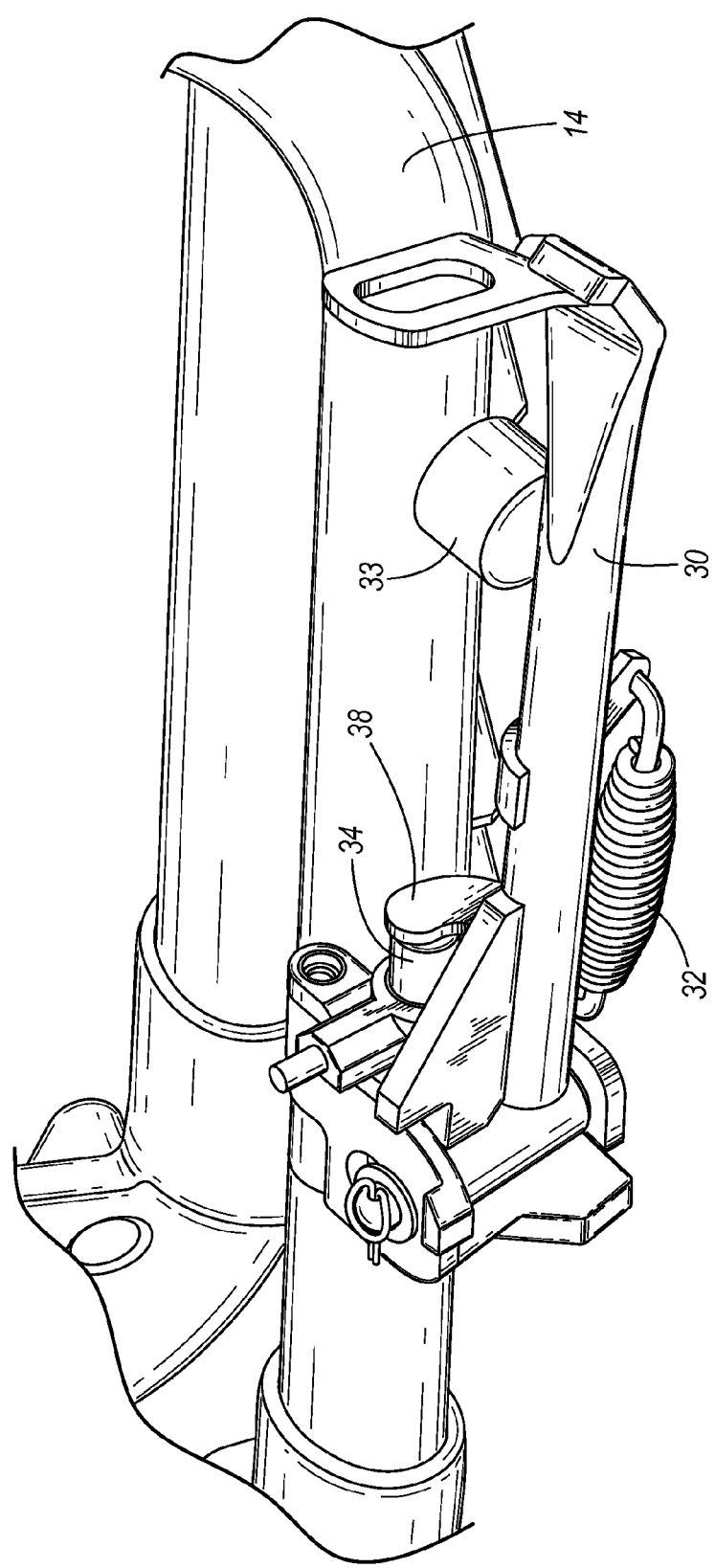
FIG. 3 is a perspective view of the side stand of the motorcycle of FIG. 1 in the retracted position.

As shown in FIGS. 2 and 3, the motorcycle 10 includes a stand position sensor 34 near the side stand 30. The stand position sensor 34 is configured to sense the position of the side stand 30 and output a signal (e.g., an electrical signal) indicative thereof. The side stand 30 is formed with a protruding flange portion 38 configured to be positioned directly in front of the stand position sensor 34 when the side stand 30 is in the retracted position. When the side stand 30 is extended, the flange portion 38 is removed from the line-of-sight of the stand position sensor 34. Thus, when the side stand 30 is in the retracted position, the stand position sensor 34 senses the presence of the flange portion 38, and when the side stand 30 is in the extended position, the stand position sensor 34 senses the absence of the flange portion 38. In alternate embodiments, the side stand 30 is formed without the flange portion 38, and is configured for interaction with the stand position sensor 34 in a different manner.

The stand position sensor 34 is a Hall-effect sensor and operates to sense the presence of the side stand 30 in the retracted position by sensing a magnet or ferrous material of the side stand 30. The stand position sensor 34 senses at least two conditions: the side stand 30 in the retracted position and the absence of the side stand 30 from the retracted position (which may occur when the side stand 30 is either extended or at least partially out of the retracted position). The stand position sensor 34 sends a signal indicative of the position of the side stand 30 to a controller, such as the engine control module (ECM) 42 (FIG. 4) of the motorcycle 10. In alternate embodiments, the stand position sensor 34 includes an ultrasonic sensor, an optical sensor, a mechanical switch (e.g., rotary switch), a potentiometer, etc. and may be configured to output a signal indicative of the position of the side stand 30 including positions between the retracted and extended positions.

Figure 4:
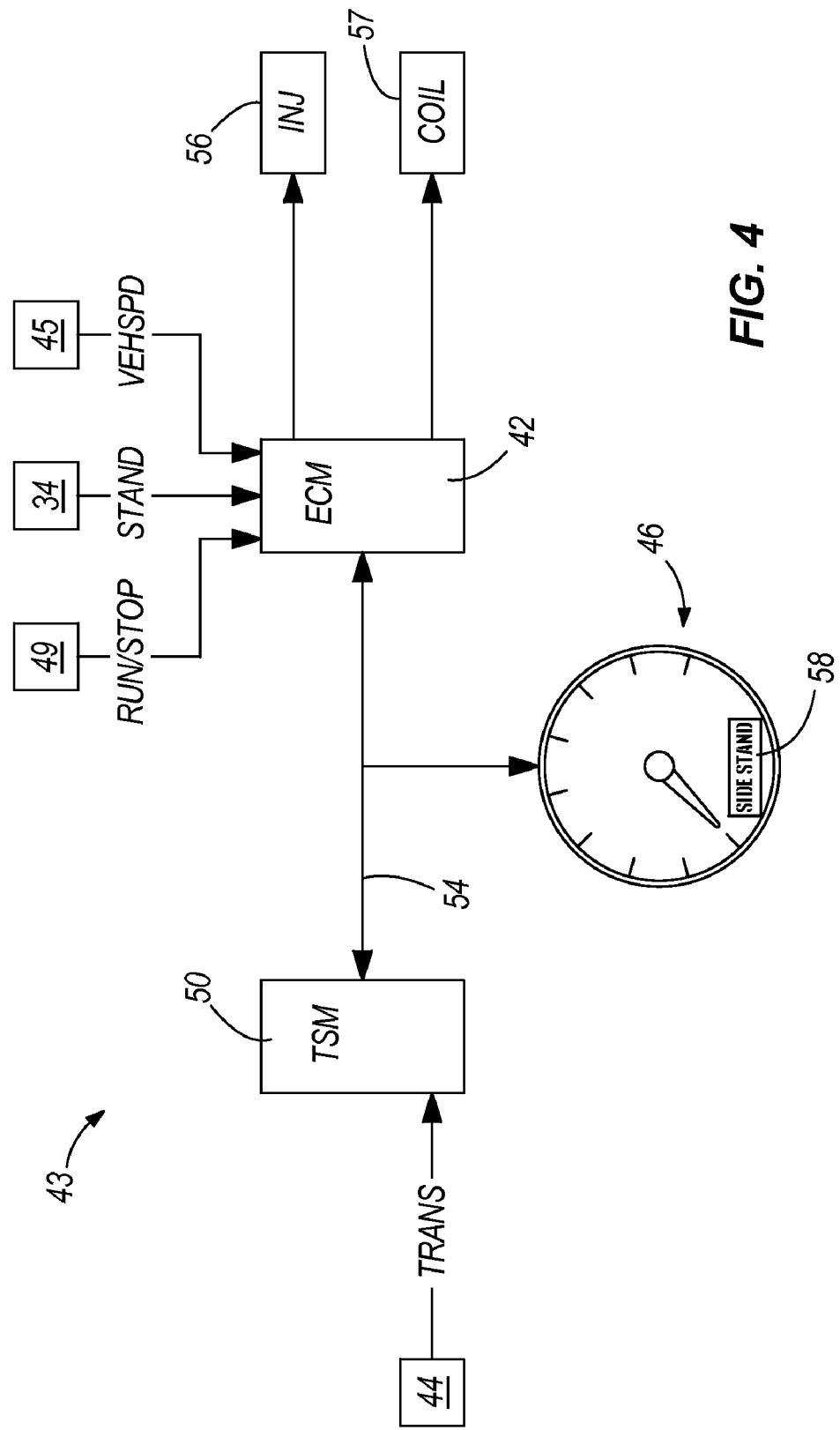
FIG. 4 is a schematic diagram of the stand interlock circuit.

The stand position sensor 34 and the ECM 42 are part of a stand interlock circuit 43 illustrated in FIG. 4. The stand interlock circuit 43 also includes a neutral switch or gear position sensor 44 to send a signal "TRANS" to the ECM 42 indicative of a state of a transmission of the motorcycle 10 (at least detecting between neutral and non-neutral i.e., "in-gear" states). The motorcycle 10 also includes a vehicle speed sensor 45 as part of the stand interlock circuit 43. The vehicle speed sensor 45 sends a signal "VEHSPD" to the ECM 42 indicative of the motorcycle's speed. The ECM 42 also monitors the state of a run/stop switch, or kill switch 49.

FIG. 4 illustrates a portion of the stand interlock circuit 43 including the ECM 42, an instrument panel 46, and a turn signal module (TSM) 50. The TSM 50 controls the operation of the motorcycle's turn signals, and also routes signals "IGN" and "TRANS" respectively from an ignition switch 52 and the gear position sensor 44 through one or more signal communication wires, such as a serial data cable, or "bus" 54 to the ECM 42. The "IGN" signal is indicative of the position of the ignition switch 52, either start/run or off. The kill switch 49 sends a "RUN/STOP" signal to the ECM 42 indicative of its position, either start/run or off. When the engine 26 is running and either the kill switch 49 is moved from the start/run position to the off position or the ignition switch 52 is moved from the start/run position to the off position, the ECM 42 ceases normal operation of the fuel injectors 56 and ignition coil 57 to stop the operation of the engine 26. Under certain circumstances, as discussed below, a "STAND" signal from the stand position sensor 34 to the ECM 42 causes the ECM 42 to stop the engine 26 in the same manner. The instrument panel 46 includes an indicator such as a message display 58 for selectively informing the rider of the stand interlock circuit status, among other things, according to parameters discussed below.

Figure 5:
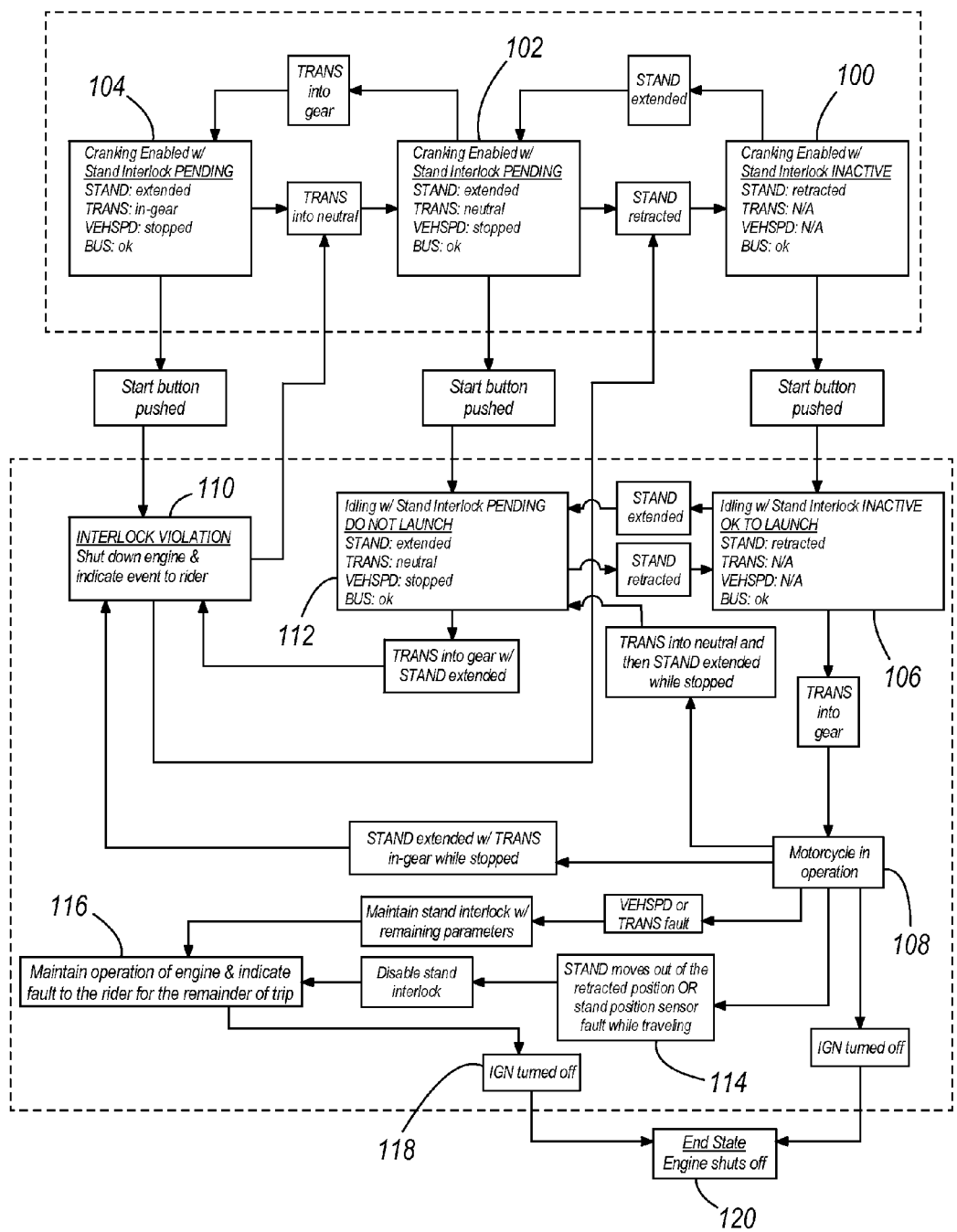
FIG. 5 is a flow diagram illustrating logic states and events occurring in the stand interlock circuit.

FIG. 5 is a logic diagram illustrating the function of the stand interlock circuit 43 as it interacts with the motorcycle 10 throughout a range of conditions. The logic states in boxes 100, 102, and 104 represent three states that can occur prior to starting the engine 26. In the first state, illustrated by box 100, the ignition switch 52 is in the start/run position (as is the kill switch 49 of FIG. 4) and the side stand 30 is retracted. The bus 54 is in-tact and communicating properly with the ECM 42, as indicated by a "BUS" signal. The ECM 42 is programmed to allow the engine 26 to be started when the start button is pushed, regardless of the "TRANS" and "VEHSPD" signals (i.e., the stand interlock circuit 43 does not prevent the engine 26 from starting based on the transmission state or the vehicle speed). When the start button is pushed from the state of box 100, the engine 26 is started (unless some other system of the motorcycle prevents starting) and the motorcycle 10 enters the state of box 106.

From box 106, the motorcycle 10 is set to launch as the stand interlock is "inactive" (i.e., the stand interlock does not prevent operation of the engine 26). The stand interlock is inactive at all times that the side stand 30 is retracted and the signal from the stand position sensor 34 indicates the same to the ECM 42. Thus, when the rider puts the transmission into gear, the motorcycle 10 can be operated and ridden normally, as represented by box 108.

If, during operation of the motorcycle 10 (from box 108 of FIG. 5), the rider disengages the clutch without shifting the transmission to neutral, and then brings the motorcycle 10 to a stop, extending the side stand 30 to the extended position (or the side stand 30 is out of the retracted position at least enough to be sensed absent by the stand position sensor 34), an interlock violation occurs, as represented by box 110 of FIG. 5. Because the side stand 30 is extended with the transmission in-gear (i.e., not in a neutral state, even though the clutch is disengaged) and the motorcycle 10 stopped, the ECM 42 is programmed to shut down the engine 26 and report the interlock violation to the rider via the instrument panel 46, such as by a text message "SIDE STAND" on the message display 58. The operation of the engine 26 is therefore prevented. As used herein, "preventing operation" of the engine 26 includes stopping the engine 26 from a running condition and also preventing starting of the engine 26 from an off or dormant state.

The transmission being in-gear and the motorcycle 10 being stopped is referred to herein as a first operating condition of the motorcycle 10. When the side stand 30 is sensed by the stand position sensor 34 to be extended during the first operating condition of the motorcycle 10, an interlock violation occurs. The motorcycle 10 is in an operating condition other than the first operating condition any time that the motorcycle is not stopped and/or the transmission is in the neutral state. The ECM 42 is programmed to monitor and analyze the operating condition of the motorcycle 10 and prevent operation of the engine 26 (e.g., by control of the fuel injectors 56 and the ignition coil 57) when an interlock violation occurs.

For the purposes of the invention, a "VEHSPD" signal indicative of a speed at or below a predetermined upper limit or threshold, such as 15 km/hr is also considered to be a "stopped" condition of the motorcycle 10 in that the stand interlock circuit 43 will respond the same as if the motorcycle 10 was absolutely stationary. In other embodiments, the stand interlock circuit 43 considers the motorcycle 10 stopped when the "VEHSPD" signal is at or below a different predetermined upper limit or threshold, such as 20 km/hr or zero km/hr.

The state of the transmission is not necessarily affected by whether or not a clutch of the motorcycle 10 is disengaged. For example, the transmission can be in the neutral state when the clutch is engaged i.e., coupling the engine 26 and the transmission. Conversely, the transmission can be in the non-neutral state i.e., "in-gear" even when the clutch is disengaged. In alternate embodiments, the "TRANS" signal is indicative of whether or not the engine 26 is drivingly coupled to the rear wheel 22, such that the signal sent to the ECM 42 depends on the state of the transmission and/or the state of the clutch of the motorcycle 10. In such embodiments, an additional sensor may be used to monitor the state of the clutch.

Returning now to the pre-operation states, the second starting state is illustrated by box 102. In this state, the ignition switch 52 is in the start/run position (as is the kill switch 49 of FIG. 4), the side stand 30 is extended, the transmission is in neutral, and the motorcycle 10 is stopped (i.e., speed is at or below the predetermined threshold). The bus 54 is in-tact and communicating properly with the ECM 42. When the start button is pushed, the engine 26 starts and the stand interlock circuit 43 enters the pending interlock state of box 112 (i.e., the motorcycle 10 is not set for launch). Lifting the side stand 30 to the retracted position and then shifting the transmission into gear will put the motorcycle 10 in operation (from box 112 to 106 to 108). However, shifting the transmission into gear without first lifting the side stand 30 will cause an interlock violation (box 110) and the engine 26 automatically shuts off.

The third pre-operation state is illustrated by box 104. In this starting state, the ignition switch 52 is in the start/run position (as is the kill switch 49 of FIG. 4), the side stand 30 is extended, the transmission is in gear, and the motorcycle 10 is stopped (i.e., speed is at or below the predetermined threshold). The bus 54 is in-tact and communicating properly with the ECM 42. Because the side stand 30 is extended with the transmission in gear and the motorcycle 10 stopped, the engine 26 is prevented from starting when the start button is pushed. In some embodiments, the engine 26 starts but is shut down immediately. As with the other sequences of events that result in an interlock violation in the stand interlock circuit 43, preventing engine operation prevents the rider of the motorcycle 10 from making an improper launch of the motorcycle 10 with the side stand 30 extended. The interlock encourages the rider to perform the correct operational sequence of lifting the side stand 30 before starting the engine 26, or at least before putting the transmission into gear. Under the circumstance that a partially extended side stand 30 is causing an interlock violation, the rider is thus encouraged to perform necessary maintenance on the side stand 30.

At any time during normal operation of the motorcycle 10 (from box 108 of FIG. 5), the rider may stop the motorcycle 10 and shift the transmission to neutral before extending the side stand 30. Under this condition, the engine 26 continues to run and the stand interlock circuit 43 enters the state of box 112, in which the interlock status is "pending". Because the motorcycle 10 is stopped and the side stand 30 is not retracted, interlock violation (box 110) and engine shutdown are pending, should the transmission be shifted from neutral into gear. From box 112, shifting the transmission into gear causes the motorcycle 10 to be in the first operating condition as discussed above, in which engine operation is prevented subject to the position of the side stand 30.

From box 112, the motorcycle 10 is returned to normal operation by first lifting the side stand 30 (to put the stand interlock circuit 43 into the state of box 106) and then shifting the transmission into gear (to enter the state of box 108). The engine 26 can be intentionally shut down by the rider at any time from the state of box 108 by switching the ignition switch 52 from the start/run position to the off position, as indicated at the bottom of FIG. 5. Although not shown in FIG. 5, switching the kill switch 49 from the start/run position to the off position is an alternative way for the rider to intentionally stop the operation of the engine 26.

Another aspect of the invention involves the intelligent function of the stand interlock circuit 43, represented at the lower portion of FIG. 5. If the side stand 30 moves out of the retracted position while the motorcycle 10 is in gear, but not stopped (i.e., the motorcycle 10 is traveling above the predetermined threshold at box 108), the engine 26 does not stop. The stand position sensor 34 detects that the side stand 30 is not in the retracted position (box 114), but the ECM 42 is programmed to allow continuous operation of the engine 26. The interlock function is temporarily disabled in this circumstance, and the message display 58 informs the rider of such (box 116). For example, the message display 58 shows a text alert, such as "SIDE STAND". In some embodiments, the interlock function is disabled for the remainder of the trip (i.e., until the engine 26 is restarted). When the interlock function is disabled, the engine 26 is not shut down at any time, under any operating condition due to the position of the side stand 30 and/or the signal sent from the stand position sensor 34 to the ECM 42. At the operator's discretion, the engine 26 is stopped (box 118), and the stand interlock circuit 43 attains the end state (box 120). The stand interlock circuit 43 is refreshed to one of the pre-operation states 100, 102, and 104 when the next starting attempt occurs.

The intelligence of the stand interlock circuit 43 allows continued operation of the engine 26 during an operating condition of the motorcycle 10 in which the motorcycle speed is above the predetermined speed, regardless of the state of the transmission and regardless of the position of the side stand 30 and the signal indicative thereof. This allows the rider to continue riding the motorcycle 10 with power from the engine 26 (box 116) when the side stand 30 moves out of the retracted position (e.g., due to a worn spring, impact with road debris, etc.). The rider may continue traveling or bring the motorcycle 10 to a controlled stop at a desired time and location.

If, at any time, the vehicle speed sensor 45 fails to report a signal to the ECM 42 or reports a signal that is deemed faulty, the "VEHSPD" signal defaults to zero, or "motorcycle stopped". The stand interlock circuit 43 continues to operate based upon the position of the side stand 30, the state of the transmission, and the assumption that the motorcycle 10 is stopped. An interlock violation occurs when the side stand 30 is out of the retracted position and the transmission is in-gear.

If, at any time, the bus 54 is not communicating the state of the transmission to the ECM 42 or communicates a signal that is deemed faulty, the "TRANS" signal defaults to "in-gear". The stand interlock circuit 43 continues to operate based upon the position of the side stand 30, the motorcycle speed, and the assumption that the transmission is in-gear. An interlock violation occurs when the side stand 30 is out of the retracted position and the motorcycle is traveling at or below the predetermined speed.

If, at any time, a fault occurs with the stand position sensor 34 (no signal or a not-trusted signal received by the ECM 42), the interlock function is temporarily disabled and the engine 26 does not stop at any time, under any operating condition, due to the position of the side stand 30. The message display 58 informs the rider that the interlock function is disabled by displaying the text alert "SIDE STAND".

What is claimed is:

1. A motorcycle comprising:
a frame;
an engine mounted to the frame;
a transmission having a neutral state and a non-neutral state;
a stand movable between an extended position in which the stand supports the motorcycle and a retracted position;
a sensor operable to generate a stand signal indicative of at least one of the extended and retracted positions of the stand; and
a controller electrically coupled to the sensor to receive the stand signal, the controller being programmed for preventing operation of the engine based on the stand signal when the motorcycle is stopped and the transmission is in the non-neutral state, the controller being further programmed for allowing continuous running of the engine regardless of the stand signal when the motorcycle is traveling.

2. The motorcycle of claim 1, further comprising:
a gear position sensor electrically coupled to the controller and operable to output a transmission signal to the controller indicative of at least one of the neutral state and the non-neutral state of the transmission.

3. The motorcycle of claim 2, further comprising:
a vehicle speed sensor operable to detect the speed of the motorcycle and communicate the speed of the motorcycle to the controller,
wherein the controller is programmed for continued monitoring of the stand signal and for preventing operation of the engine when one of the gear position sensor and the vehicle speed sensor fails to communicate successfully with the controller, preventing operation of the engine being dependent upon the stand signal and an output of the other of the gear position sensor and the vehicle speed sensor.

4. The motorcycle of claim 1, further comprising an indicator configured to alert a rider of the motorcycle that at least one of preventing and stopping operation of the engine has occurred due to the stand signal.

5. The motorcycle of claim 1, further comprising an indicator configured to alert a rider of the motorcycle when the stand signal is indicative of the extended position of the stand while the motorcycle is traveling.

6. The motorcycle of claim 1, wherein the controller is programmed to determine whether the motorcycle is stopped or traveling by comparing a sensed vehicle speed to a predetermined speed.

7. The motorcycle of claim 6, wherein the predetermined speed is between about zero kilometers per hour and about 20 kilometers per hour.

8. The motorcycle of claim 1, wherein the controller is further programmed to disable all dependency of engine operation based on the stand signal if the stand signal indicates to the controller that the stand has moved out of the retracted position while the motorcycle is traveling.

9. The motorcycle of claim 8, wherein the controller is further programmed to re-enable dependency of engine operation based on the stand signal upon restarting of the engine.

10. An interlock circuit for a motorcycle, the motorcycle including a frame, an engine mounted to the frame, a transmission coupled to the engine, and a stand movable between an extended position for supporting the motorcycle and a retracted position, the interlock circuit comprising:
 a sensor operable to generate a stand signal indicative of at least one of the extended and retracted positions of the stand; and
 a controller electrically coupled to the sensor to receive the signal, the controller being programmed for preventing operation of the engine based on the stand signal when the motorcycle is stopped and the transmission is in a non-neutral state, the controller being further programmed to allow running of the engine regardless of the stand signal when the motorcycle is traveling.

11. The interlock circuit of claim 10, further comprising a gear position sensor electrically coupled to the controller and operable to output a transmission signal to the controller indicative of at least one of a neutral and the non-neutral state of the transmission.

12. The interlock circuit of claim 11, further comprising:
 a vehicle speed sensor operable to detect the speed of the motorcycle and communicate the speed of the motorcycle to the controller,
 wherein the controller is programmed for continued monitoring of the stand signal and for preventing operation of the engine when one of the gear position sensor and the vehicle speed sensor fails to communicate successfully with the controller, preventing operation of the engine being dependent upon the stand signal and an output of the other of the gear position sensor and the vehicle speed sensor.

13. The interlock circuit of claim 10, further comprising an indicator configured to alert a rider of the motorcycle that at least one of preventing and stopping operation of the engine has occurred due to the stand signal.

14. The interlock circuit of claim 10, further comprising an indicator configured to alert a rider of the motorcycle when the stand signal is indicative of the extended position of the stand while the motorcycle is traveling.

15. The interlock circuit of claim 10, wherein the controller is programmed to determine whether the motorcycle is stopped or traveling by comparing a sensed vehicle speed to a predetermined speed.

16. The interlock circuit of claim 15, wherein the predetermined speed is between about zero kilometers per hour and about 20 kilometers per hour.

17. The interlock circuit of claim 10, wherein the controller is further programmed to disable all dependency of engine operation based on the stand signal if the stand signal indicates to the controller that the stand has moved out of the retracted position while the motorcycle is traveling.

18. The motorcycle of claim 17, wherein the controller is further programmed to re-enable dependency of engine operation based on the stand signal upon restarting of the engine.

19. A method of operating a motorcycle having an engine, a transmission, and a stand, which supports the motorcycle in an extended position and is movable to a retracted position, the method comprising:
 sensing a position of the stand;
 sensing a traveling speed of the motorcycle;
 preventing operation of the engine based on the sensed position of the stand when the motorcycle is stopped; and
 allowing operation of the engine regardless of the sensed position of the stand when the motorcycle is traveling.

20. The method of claim 19, further comprising:
 sensing the traveling speed of the motorcycle with a vehicle speed sensor and sensing whether the transmission is in a neutral state or the non-neutral state with a gear position sensor.

21. The method of claim 20, further comprising:
 selectively preventing operation of the engine based on the sensed position of the stand and one of a speed of the motorcycle and a neutral/non-neutral state of the transmission when the other of the speed of the motorcycle and the neutral/non-neutral state of the transmission is unable to be detected.

22. The method of claim 19, further comprising actuating a visual indicator when the stand is sensed to move from the retracted position to the extended position.

23. The method of claim 19, wherein the controller is programmed to determine whether the motorcycle is stopped or traveling by comparing a sensed vehicle speed to a predetermined speed.

24. The method of claim 23, wherein the predetermined speed is between about zero kilometers per hour and about 20 kilometers per hour.

25. The method of claim 19, further comprising discontinuing the dependency of engine operation based on the sensed position of the stand if the stand is sensed to move out of the retracted position while the motorcycle is traveling.

26. The method of claim 25, further comprising re-establishing dependency of engine operation based on the sensed position of the stand upon restarting of the engine.

* * * * *